(12) United States Patent
Hsieh

(10) Patent No.: US 7,005,568 B2
(45) Date of Patent: Feb. 28, 2006

(54) EXTENSION CONNECTOR FOR AN ANGLE ADJUSTABLE CYMBAL STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 165 days.

(21) Appl. No.: 10/776,050

(22) Filed: Feb. 10, 2004

(65) Prior Publication Data

US 2005/0172782 A1 Aug. 11, 2005

(51) Int. Cl.
*G10D 13/02* (2006.01)
(52) U.S. Cl. .................. 84/422.1; 84/422.2; 84/422.3
(58) Field of Classification Search .............. 84/422.1, 84/422.2, 422.3; 403/90, 122, 137, 141, 403/142
See application file for complete search history.

(56) References Cited

U.S. PATENT DOCUMENTS

| | | | | |
|---|---|---|---|---|
| 4,979,844 A | * | 12/1990 | Teramachi | ................... 403/134 |
| 5,109,321 A | * | 4/1992 | Maglica et al. | ............. 362/191 |
| 6,093,878 A | * | 7/2000 | Hoshino | ....................... 84/421 |
| 6,274,797 B1 | * | 8/2001 | Liao | ............................ 84/421 |
| 6,774,293 B1 | * | 8/2004 | Hsieh | .......................... 84/327 |

* cited by examiner

*Primary Examiner*—Kimberly Lockett
(74) *Attorney, Agent, or Firm*—William E. Pelton, Esq.

(57) ABSTRACT

An extension connector has a threaded end formed on a first end of the extension connector for connection with a threaded hole of a receptacle and a threaded hole adapted for connection with a threaded end of a ball linkage such that an angle adjustable cymbal stand is able to extend to any position for connection with a cymbal.

1 Claim, 5 Drawing Sheets

EXTENSION CONNECTOR FOR AN ANGLE ADJUSTABLE CYMBAL STAND

BACKGROUND OF THE INVENTION

1. Field of the Invention

The present invention relates to an extension connector, and more particularly to an extension for an angle adjustable cymbal stand to enable the adjustable cymbal stand to not only extend to a desired length but also adjust to a desired angle.

2. Description of Related Art

With reference to FIGS. 4 and 5, a conventional angle adjustable cymbal stand is shown to have a seat (50) firmly engaged with a support rod (61) extending from a stand (60) and a rod (52) extending from a ball (51) which is movably received in the seat (50). A knob (53) is provided on a side of the seat (50) to control the movement of the ball (51) inside the seat (50). A cymbal (64) is securely connected to the rod (52) and a nut (63) is provided to engage with a free end of the rod (52) after the rod (52) extends through the cymbal (64). A spacer (62) is sandwiched between the cymbal (64) and the nut (63).

Therefore, when the operator needs to adjust the angle of the cymbal stand, the operator needs only to loosen the knob (53) to allow the ball (51) to freely move inside the seat (50) such that the cymbal (64) angle is adjusted to cope with the space limitation.

Although the conventional cymbal stand does provide an angle adjusting function, the angle adjusting range of the cymbal (64) is limited by the length of the rod (52). That is, if a cymbal set is required and each of the cymbals is connected to one another closely, it is almost impossible to have room enough to allow the operator to proceed the angle adjusting process.

To overcome the shortcomings, the present invention tends to provide an extension connector to mitigate the aforementioned problems.

SUMMARY OF THE INVENTION

The primary objective of the present invention is to provide an improved angle adjustable cymbal stand having an extension connector to allow the operator to have sufficient room to cope with the space limit problem.

Another objective of the present invention is that the extension corrector is simple in assembly and inexpensive in manufacture yet the function provided enables the cymbal stand to enlarge the angle adjusting range.

Other objects, advantages and novel features of the invention will become more apparent from the following detailed description when taken in conjunction with the accompanying drawings.

DETAILED DESCRIPTION OF THE PREFERRED EMBODIMENT

Figure 1:
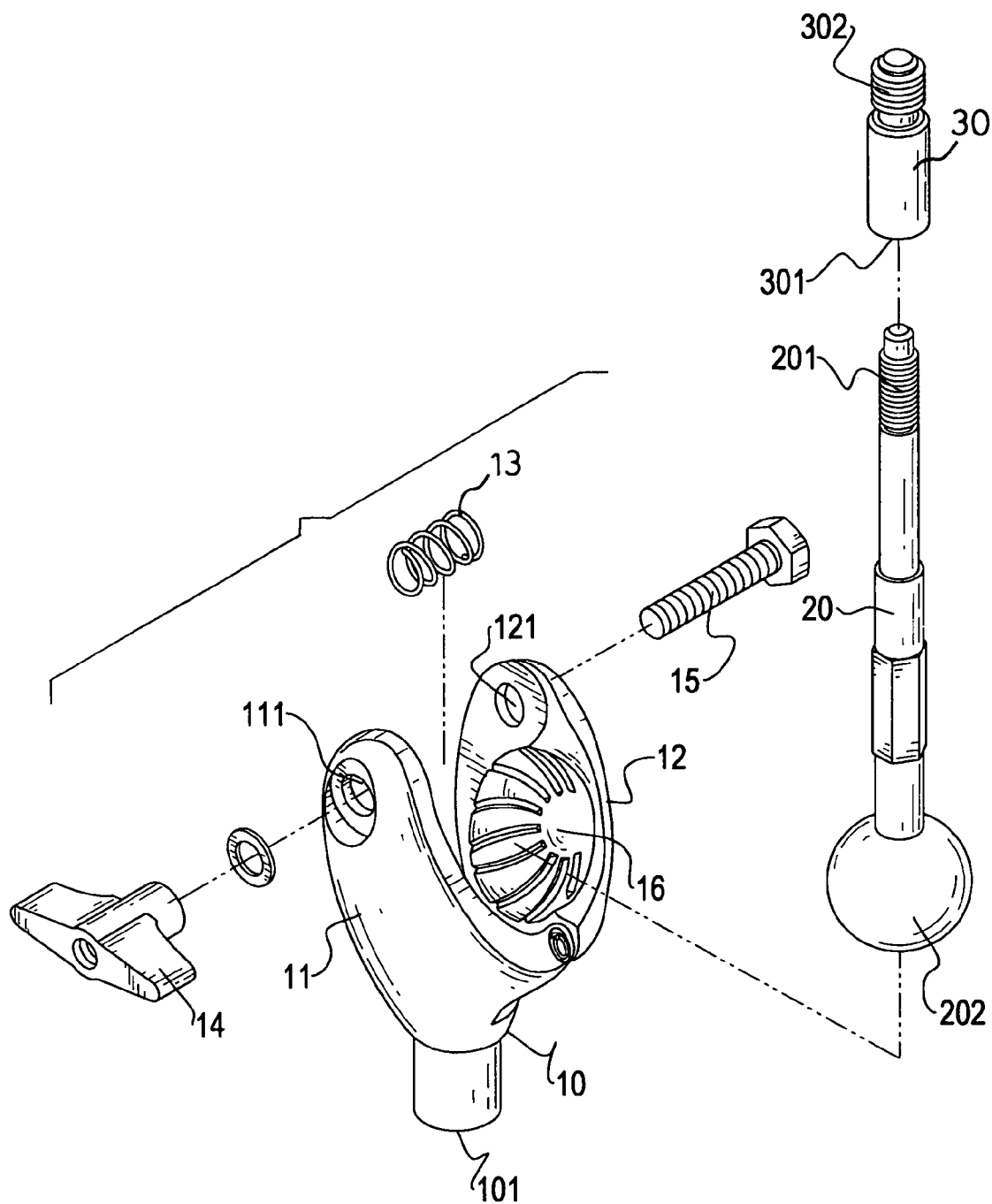
FIG. 1 is an exploded perspective view showing the elements of the present invention.

With reference to FIG. 1, the angle adjustable cymbal stand in accordance with the present invention has a receptacle (10) composed of two halves (11,12) pivotally connected with one another and defining therebetween a space (16), a ball linkage (20) having a first threaded end (201) at one end and a ball (202) at the other end and an extension connector (30) having a first threaded hole (301) at a first end of the extension connector (30) to correspond to the first threaded end (201) of the ball linkage (20) and a second threaded end (302) at a second end of the extension connector (30).

The receptacle (10) has a second threaded hole (101) defined in a bottom face of the receptacle (10) to correspond to the first threaded end (201) of the ball linkage (20). Each of the two halves (11,12) has a through hole (111,121) defined to align with one another and to allow a threaded bolt (15) to extend therethrough. A spring (13) is received in the space (16) and mounted around the threaded bolt (15). An adjusting knob (14) is provided to threadingly connect to the threaded bolt (15) to control the movement of the two halves (11,12).

Figure 2:
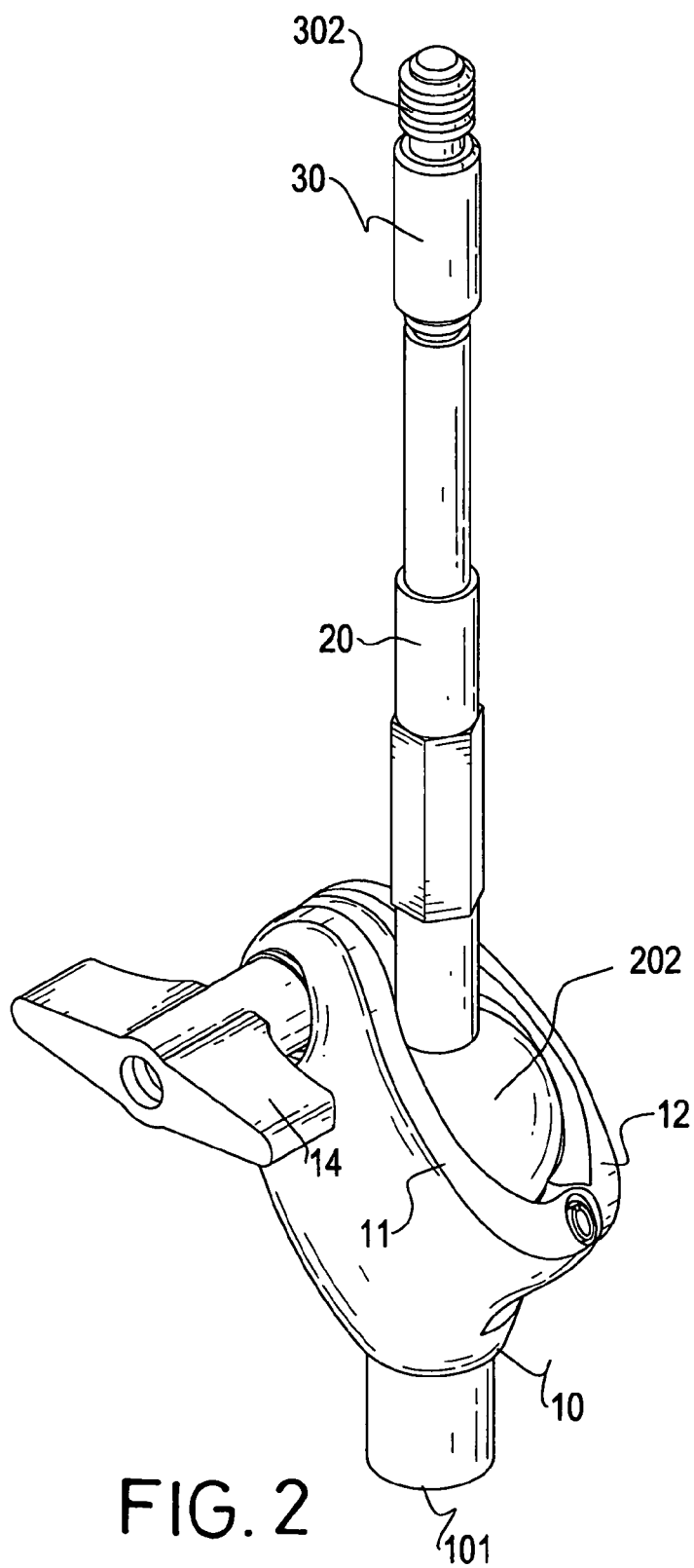
FIG. 2 is a perspective view showing the assembly of the angle adjustable cymbal stand of the present invention.

With reference to FIG. 2, when the angle adjustable cymbal stand of the present invention is assembled, the ball (202) is received in the space (16). Then the operator is able to tighten the adjusting knob (14) to secure the two halves (11,12) of the receptacle (10) such that the ball (202) is firmly clamped between the two halves (11,12). Thereafter, the operator is able to use the second threaded end (302) to secure a cymbal (not shown).

Figure 3:
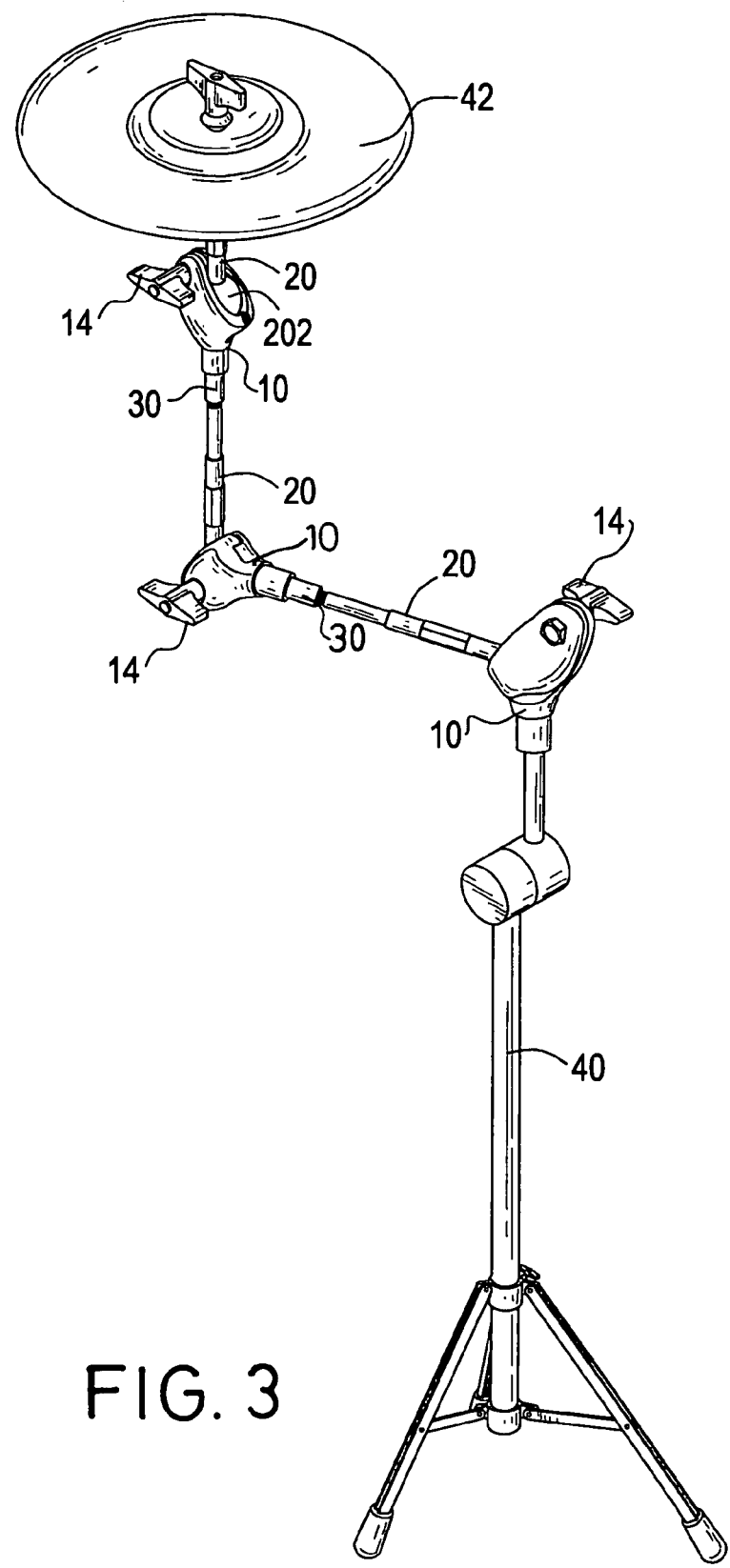
FIG. 3 is a perspective view showing the application of the extension connector of the present invention.
Figure 4:
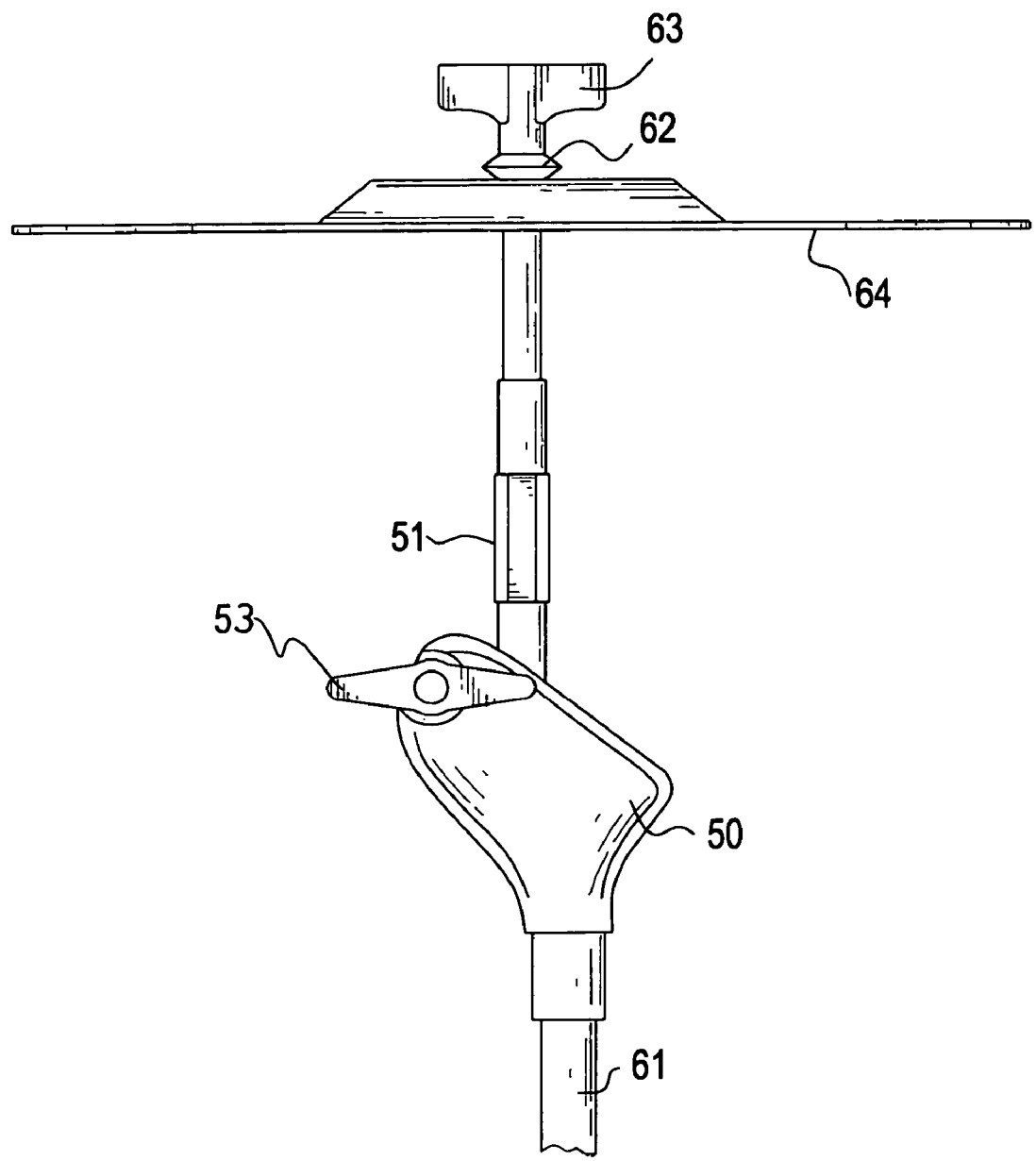
FIG. 4 is a side view showing a conventional angle adjustable cymbal stand.
Figure 5:
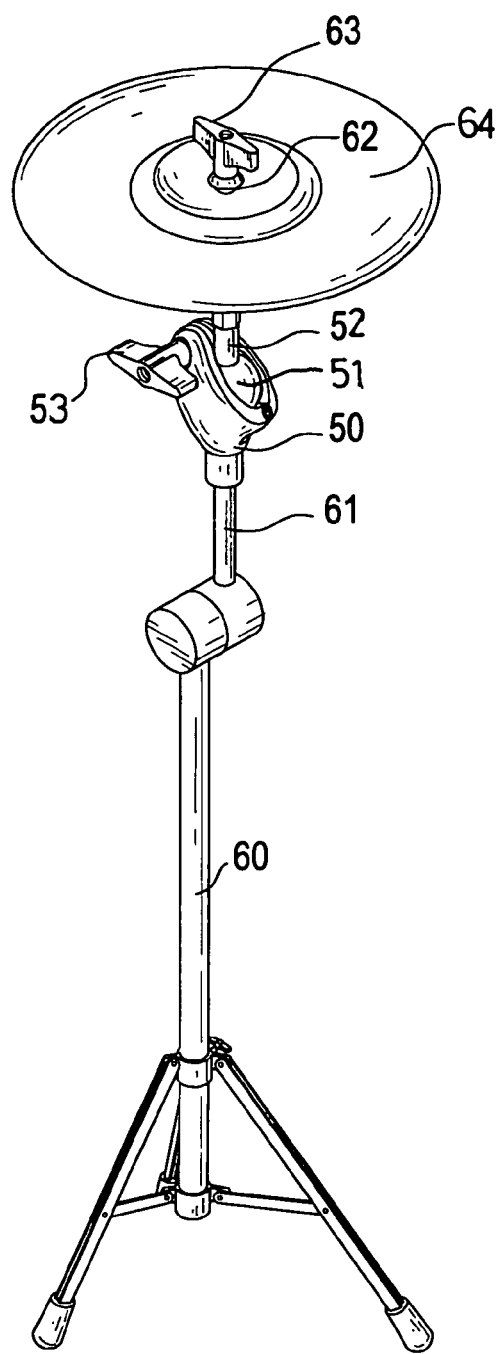
FIG. 5 is a perspective view showing the application of the conventional angle adjustable cymbal stand with a cymbal.

With reference to FIG. 3, when the space available is limited and the operator has to setup a series of cymbals to perform, the operator is able to use the second threaded end (302) to extend into the second threaded hole (101) of another receptacle (10) which has its own ball linkage (20) for connection with another set of ball linkage (20) and/or a cymbal (42). The connection between the cymbal (42) and a ball linkage (20) is the same as that described earlier such that the detailed description thereof is omitted.

With the provision of the extension connector (30), the operator is able to extend the angle adjustable cymbal stand (40) to any position appropriate such that the operator is able to setup as many cymbals as possible around the performer without influencing the performer's performance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An extension connector for an angle adjustable cymbal stand having a receptacle with a first threaded hole defined in a bottom of the receptacle for connection with a stand and a ball linkage with a first threaded end at a first end of the ball linkage and a ball at a second end of the ball linkage to be movably received in the receptacle and an adjusting knob provided on a side of the receptacle to control the movement of the ball inside receptacle, wherein the improvement comprises:

an extension connector having a second threaded end formed on a first end of the extension connector for connection with the first threaded hole of the receptacle and a second threaded hole adapted for connection with the first threaded end of the ball linkage such that the angle adjustable cymbal stand is able to extend to any position for connection with a cymbal.

* * * * *